US010612410B2

(12) United States Patent
Blake et al.

(10) Patent No.: US 10,612,410 B2
(45) Date of Patent: Apr. 7, 2020

(54) LOW COMPRESSOR HAVING VARIABLE VANES

(71) Applicant: United Technologies Corporation, Hartford, CT (US)

(72) Inventors: Sean D J Blake, Andover, CT (US); William G. Tempelman, Ellington, CT (US); Matthew D. Teicholz, Mystic, CT (US); John R. Gendron, Enfield, CT (US); Kerri A. Wojcik, Coventry, CT (US); Paul H. Spiesman, Coventry, CT (US); Stewart B. Hatch, Windsor, CT (US); Wyatt S. Daentl, Stafford, CT (US); Glenn D. Bartkowski, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 536 days.

(21) Appl. No.: 14/431,953

(22) PCT Filed: Jan. 28, 2013

(86) PCT No.: PCT/US2013/023372
§ 371 (c)(1),
(2) Date: Mar. 27, 2015

(87) PCT Pub. No.: WO2014/055100
PCT Pub. Date: Apr. 10, 2014

(65) Prior Publication Data

US 2015/0260054 A1 Sep. 17, 2015

Related U.S. Application Data

(60) Provisional application No. 61/708,076, filed on Oct. 1, 2012.

(51) Int. Cl.
*F02C 1/00* (2006.01)
*F01D 17/16* (2006.01)
*F04D 29/56* (2006.01)

(52) U.S. Cl.
CPC ......... *F01D 17/162* (2013.01); *F04D 29/563* (2013.01); *F05D 2260/4031* (2013.01)

(58) Field of Classification Search
CPC .... F02C 9/20; F02C 9/54; F01D 17/14; F01D 17/162; F01D 17/16
See application file for complete search history.

(56) References Cited

U.S. PATENT DOCUMENTS 3,974,645 A * 8/1976 Smith .................. F01K 23/105 290/40 C
5,133,182 A * 7/1992 Marcos ..................... F02C 9/28 60/39.27

(Continued)

FOREIGN PATENT DOCUMENTS

EP 2133514 12/2009
EP 2148044 A2 1/2010

OTHER PUBLICATIONS

International Search Report dated Sep. 20, 2013.

(Continued)

*Primary Examiner* — Gerald L Sung
(74) *Attorney, Agent, or Firm* — Carlson, Gaskey & Olds, P.C.

(57) ABSTRACT

An example gas turbine engine compressor includes a first compressor section. The first compressor section includes a rotating stage that includes rotating blades and a stationary stage upstream thereof that includes stationary guide vanes. The stationary vanes controllably pivot about respective pivot axes for providing flow control into the rotating stage.

12 Claims, 4 Drawing Sheets

(56) References Cited

U.S. PATENT DOCUMENTS

| | | | | |
|---|---|---|---|---|
| 5,622,473 | A | 4/1997 | Payling | |
| 5,911,679 | A | 6/1999 | Farrell et al. | |
| 7,125,222 | B2 | 10/2006 | Cormier et al. | |
| 7,713,022 | B2 | 5/2010 | Major et al. | |
| 7,806,652 | B2 | 10/2010 | Major et al. | |
| 7,963,742 | B2 | 6/2011 | Clouse et al. | |
| 8,197,209 | B2 | 6/2012 | Wagner | |
| 2007/0031238 | A1 * | 2/2007 | Fujii | F02C 9/20 415/48 |
| 2007/0253805 | A1 * | 11/2007 | Micheli | F01D 17/162 415/13 |
| 2010/0005808 | A1 * | 1/2010 | Nanataki | F02C 9/20 60/773 |
| 2010/0278639 | A1 * | 11/2010 | Hood | F01D 17/16 415/162 |
| 2010/0310358 | A1 * | 12/2010 | Major | F01D 17/162 415/159 |
| 2011/0171007 | A1 * | 7/2011 | Johnson | F01D 17/162 415/145 |

OTHER PUBLICATIONS

International Preliminary Report on Patentability for International Application No. PCT/US2013/023372 dated Apr. 16, 2015.

Extended European Search Report for application No. 13844263.7 dated Oct. 26, 2015.

* cited by examiner

LOW COMPRESSOR HAVING VARIABLE VANES

CROSS-REFERENCE TO RELATED APPLICATIONS

This application claims priority to U.S. Provisional Application No. 61/708,076, which was filed on 1 Oct. 2012 and is incorporated herein by reference.

BACKGROUND

This disclosure relates generally to a compressor section of a gas turbine engine and, more particularly, to variable vanes that influence flow to a low pressure compressor of the gas turbine engine.

A gas turbine engine typically includes a fan section, a compressor section, a combustor section, and a turbine section. Air entering the compressor section is compressed and delivered into the combustion section where it is mixed with fuel and ignited to generate a high speed exhaust gas flow. The high speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine, and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer, and propulsive efficiencies.

SUMMARY

A gas turbine engine compressor according to an exemplary aspect of the present disclosure includes, among other things, a first compressor section, the first compressor section including at least one rotating stage that includes rotating blades and at least one stationary stage upstream thereof that includes stationary guide vanes, which controllably pivot about respective pivot axes for providing flow control into the rotating stage.

In a further non-limiting embodiment of the foregoing gas turbine engine compressor, the first compressor section is a low pressure compressor section and the gas turbine engine compressor further comprises a second compressor section that is a high pressure section. The low pressure compressor section may experience lower pressures than the high pressure compressor section during operation.

In a further non-limiting embodiment of either of the foregoing gas turbine engine compressors, the first compressor section may be an axially forwardmost compressor section of the gas turbine engine relative to a direction of flow through the gas turbine engine.

In a further non-limiting embodiment of any of the foregoing gas turbine engine compressors, the stationary vane stage may be the axially forwardmost vane stage of the first compressor section.

In a further non-limiting embodiment of any of the foregoing gas turbine engine compressors, a first stage of the first compressor section may be the stationary stage.

In a further non-limiting embodiment of any of the foregoing gas turbine engine compressors, the first compressor section may be operatively coupled to a fan drive shaft of the gas turbine engine.

In a further non-limiting embodiment of any of the foregoing gas turbine engine compressors, the fan drive shaft may be operatively coupled to a geared architecture configured to drive a fan of the gas turbine engine at a different rotational speed than a rotational speed of the fan drive shaft.

In a further non-limiting embodiment of any of the foregoing gas turbine engine compressors, the low pressure compressor may be positioned axially between a fan of the gas turbine engine and a high pressure compressor of the gas turbine engine.

In a further non-limiting embodiment of any of the foregoing gas turbine engine compressors, the pivotable vanes are inlet guide vanes.

A method of controlling flow into a compressor of a gas turbine engine, wherein the compressor has a first compressor section, at least one rotating stage that includes rotating blades and at least one stationary stage upstream thereof that includes stationary guide vanes, which controllably pivot about respective pivot axes for providing flow control into the rotation stage. Another exemplary aspect of the present disclosure includes, among other things, pivoting the guide vanes to influence flow to the rotating blades.

In a further non-limiting embodiment of the foregoing method of controlling flow, the stationary vanes may form a portion of a first stage of the compressor.

In a further non-limiting embodiment of either of the foregoing methods of controlling flow, the method includes pivoting the stationary vanes from a first position to a second position to influence the flow, the first position defining a first throat area in the compressor, the second position corresponding to a second throat area in the compressor that may be between 62 percent and 65 percent of the first throat area.

A gas turbine engine according to an exemplary aspect of the present disclosure includes, among other things, a fan including a plurality of fan blades rotatable about an axis; a compressor section including a first compressor section; a combustor in fluid communication with the compressor section; a turbine section in fluid communication with the combustor; a geared architecture driven by the turbine section for rotating the fan about the axis; and the first compressor section, and at least one rotating stage that includes rotating blades and at least one stationary stage upstream thereof that includes stationary guide vanes, which controllably pivot about respective pivot axes for providing flow control into the rotation stage.

In a further non-limiting embodiment of the foregoing gas turbine engine, the first compressor section may be a low pressure section and the engine further comprises a second compressor section that may be a high pressure section, the low pressure compressor section experiences lower pressures than the high pressure compressor section during operation.

In a further non-limiting embodiment of either of the foregoing gas turbine engines, the stationary vane stage may be the forwardmost stage of the low pressure compressor relative to a direction of flow through the engine.

In a further non-limiting embodiment of any of the foregoing gas turbine engines, the stationary vanes may be configured to move from a first position to a second position to influence the flow, the first position corresponding to a first compressor throat area, the second position corresponding to a second compressor throat area that may be between 62 percent and 65 percent of the first throat area.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
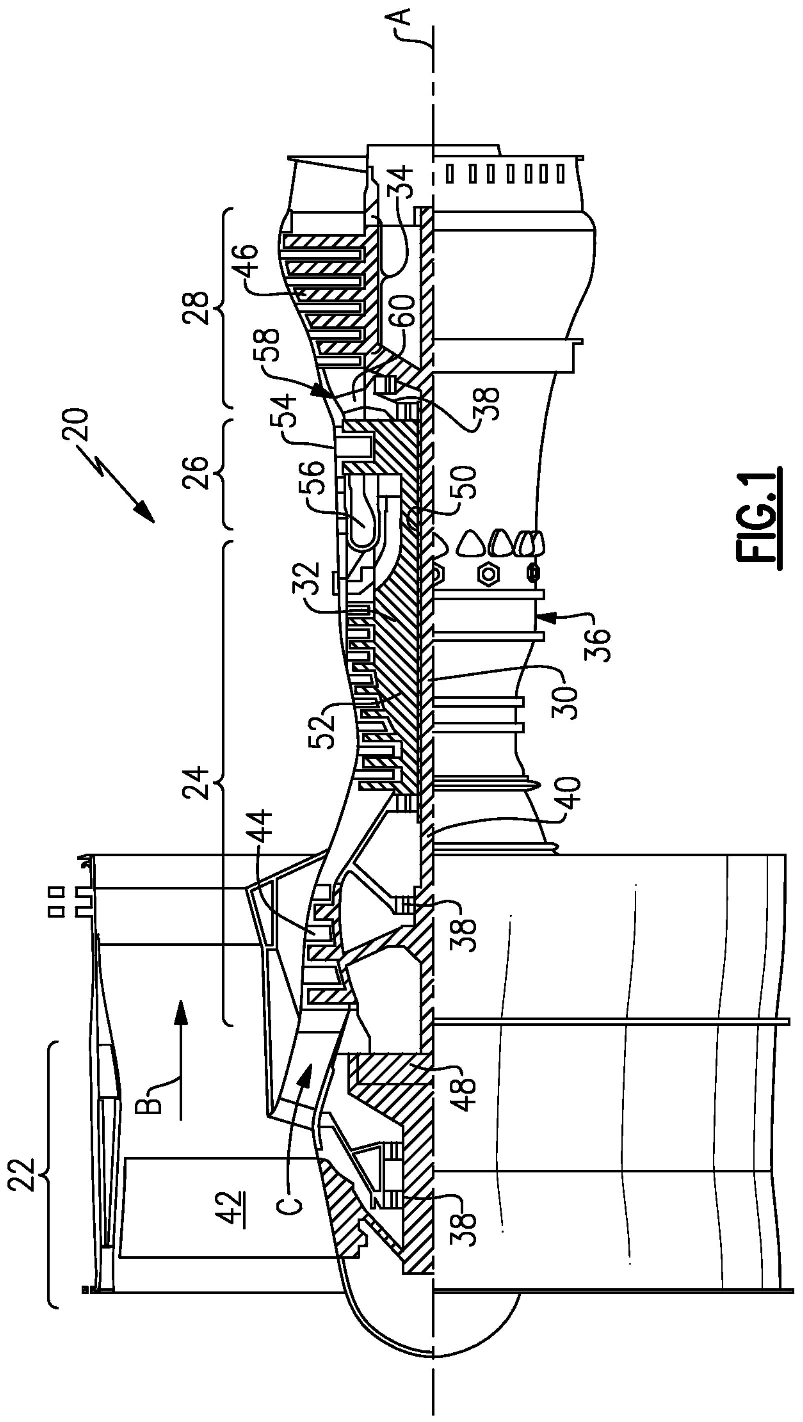
FIG. 1 shows a section view of an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/(518.7° R)]^0.5. The "Low corrected fan tip speed," as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
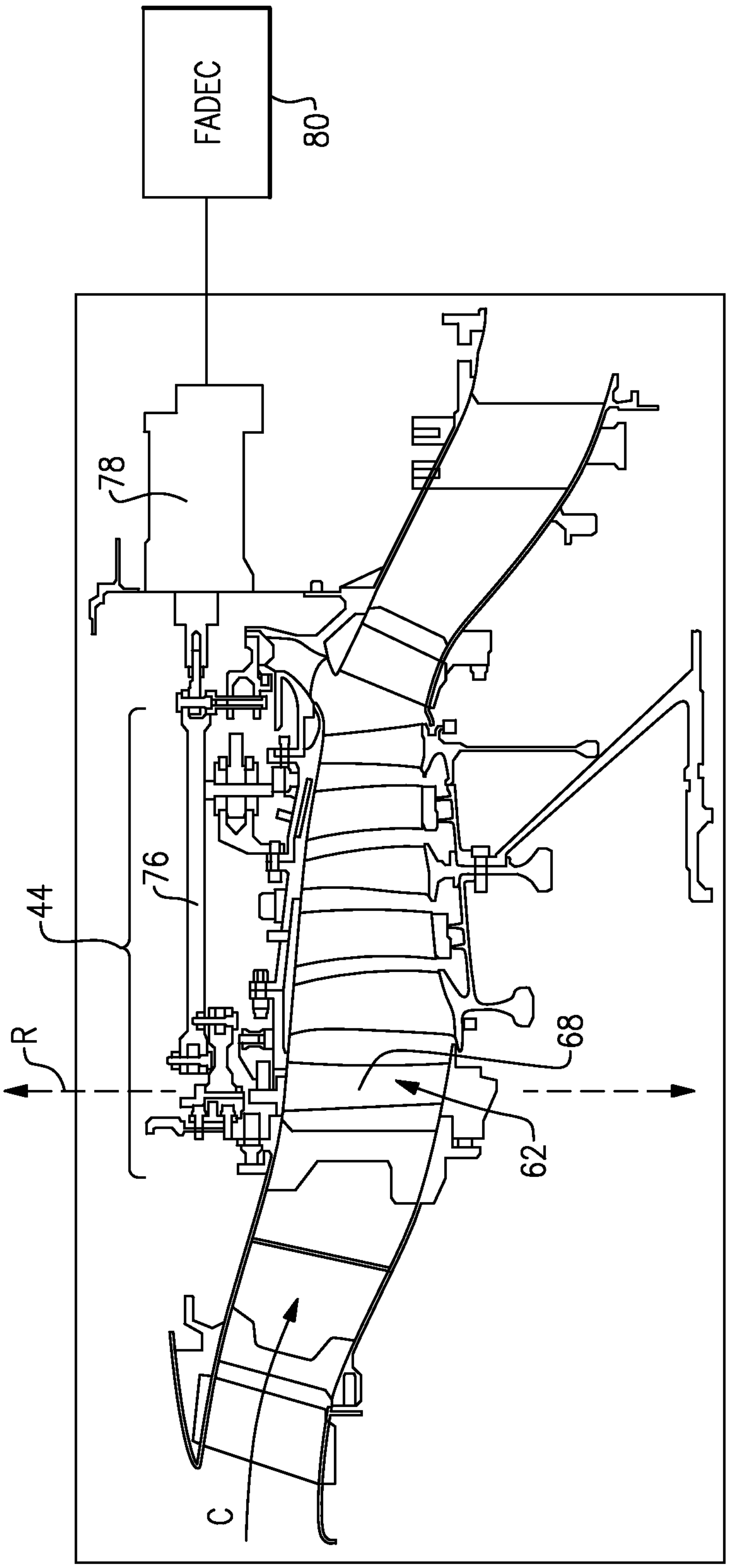
FIG. 2 shows a close up section view of a low pressure compressor of the gas turbine engine of FIG. 1.
Figure 3:
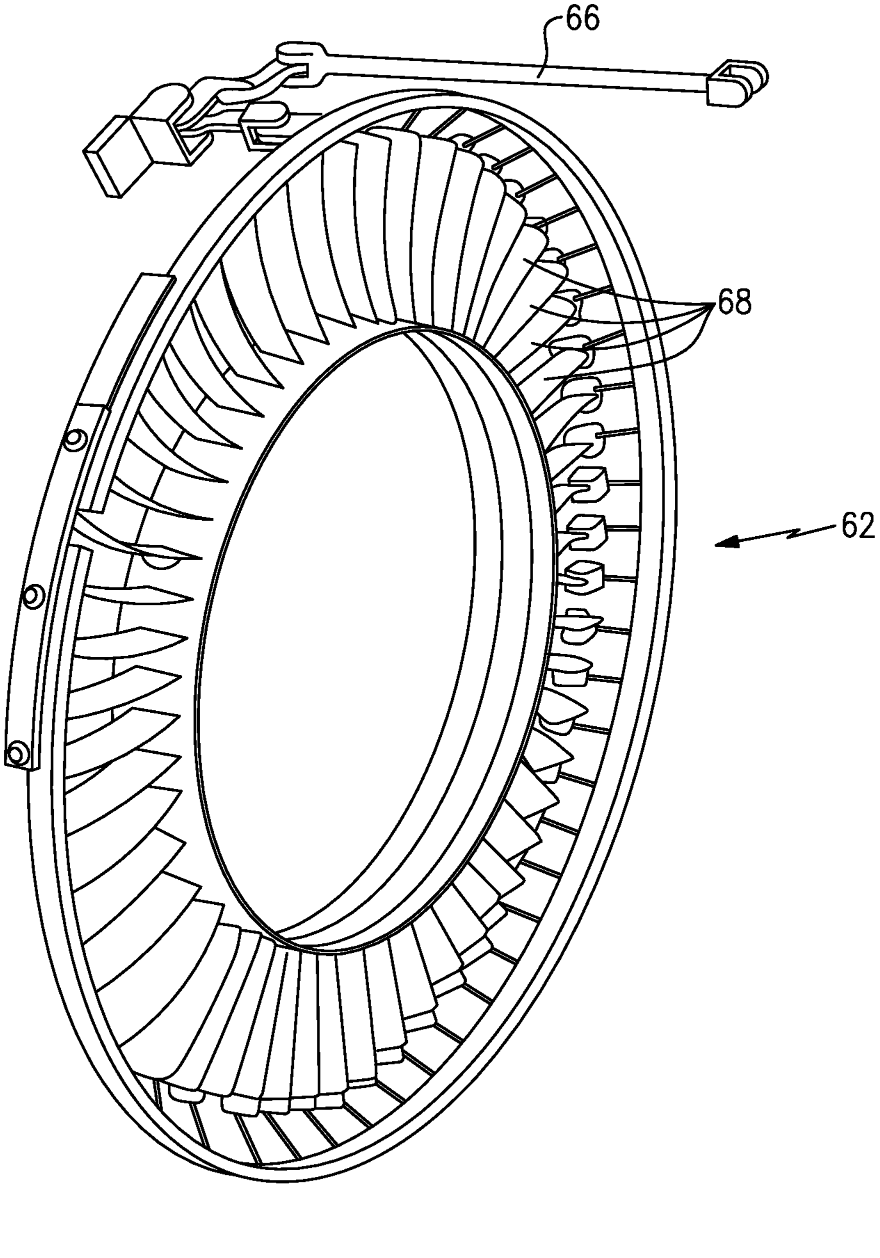
FIG. 3 shows a variable vane assembly from the low pressure compressor of FIG. 2.

Referring to FIGS. 2 and 3 with continuing reference to FIG. 1, the example low pressure compressor 44 includes a variable vane assembly 62 having a plurality of radially extending variable vanes 68.

The low pressure compressor 44 is considered a low pressure compressor of the engine 20 as it experiences lower pressures during operation than the high pressure compressor 52 of the engine 20. The example low pressure compressor 44 is positioned axially between the fan 42 of the engine 20 and the high pressure compressor 52 of the engine 20.

Notably, the low pressure compressor 44 is driven by the low speed spool 30, which is operably coupled to the geared architecture 48 of the engine 20. The low speed spool 30 thus includes portions that function as a fan drive shaft as the low speed spool 30 rotates the geared architecture 48 to drive the fan 42.

In this example, the variable vane assembly 62 provides the axially forwardmost stage of the low pressure compressor 44. More specifically, in this example, the vanes 68 are inlet guide vanes and the forwardmost vanes of the low pressure compressor 44.

Each of the vanes 68 is rotatable about a respective radially extending axis, such as the axis R, to influence flow into the low pressure compressor 44. The axis R extends radially from the axis A. Each of the vanes 68 may be rotated about its axis R between positions that permit more flow and positions that permit less flow to tailor flow into the low pressure compressor 44 to balance system operability and enhance performance.

The example vanes 68 are pivoted via a pivoting mechanism that has an arm 76. An actuator 78 moves the arm 76 to rotate the vanes 68 about their respective axes. A Full Authority Digital Engine Control (FADEC) is schematically illustrated at 80. The FADEC 80 controls the actuator 78 to control pivoting of the vanes 68.

In this example, the positioning of the vanes 68 is controlled as a function of corrected low pressure compressor speed. In some examples, at low power settings, the vanes 68 are moved to a more closed position. At higher rotational speeds, the vanes 68 are rotated to a more open position. The more closed position permits less flow through the low pressure compressor 44 than the more open position.

Figure 4:
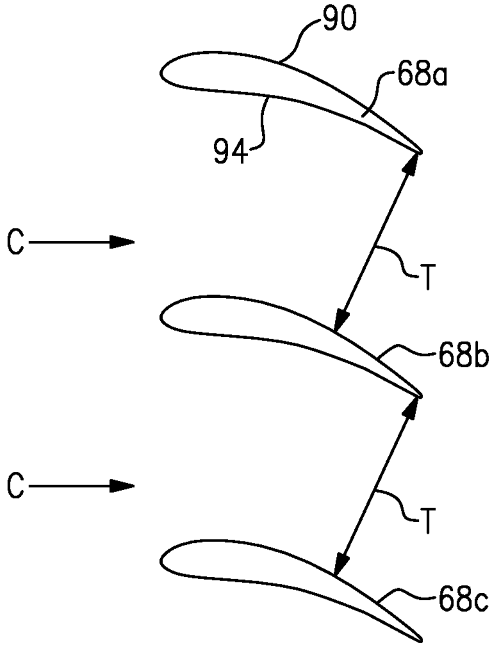
FIG. 4 shows a section view of variable vanes of the variable vane assembly of FIG. 3 in a first position.
Figure 5:
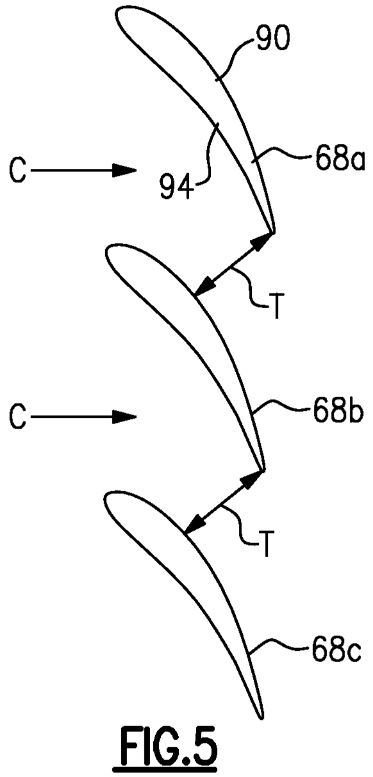
FIG. 5 shows a section view of variable vanes of the variable vane assembly of FIG. 3 in a second position that restricts more flow into the low pressure compressor than the first position.

Referring now to FIGS. 4 and 5 with continuing reference to FIGS. 2 and 3, a top view cutaway of an example embodiment of the variable vane assembly 62 includes adjacent variable vanes **68*a*, 68*b* and 68*c*. The vanes 68*a*-68*c* are attached to a stationary portion of the gas turbine engine 20, such as a case structure (not shown). The vanes 68*a*-68*c* have a suction surface 90 and a pressure surface 94. During operation of the engine 20, flow moving along the core flow path C moves into the low pressure compressor 44 between adjacent ones of the vanes 68*a*-68*c*. The adjacent vanes define a throat area T, which represents the minimal area between adjacent ones of the vanes 68*a*-68*c*. Flow moves into the low pressure compressor 44** through the throat area T.

Various factors can influence the location and size of the throat area T. For example, the shape of the vanes **68*a*-68*c*, the stagger angle of the vanes 68*a*-68*c* relative to the core flow path C, and the orientation of the vanes 68*a*-68*c*** are all possible factors that can influence the size of the throat area T.

FIG. 4 shows the vanes **68*a*-68*c* when the low pressure compressor 44 is operating at a relatively high rotational speed. FIG. 5 shows the vanes 68*a*-68*c* when the low pressure compressor 44 is operating at a relatively low rotational speed. The vanes 68*a*-68*c* are shown in a more open position in FIG. 4 than in FIG. 5. The more open position corresponds to the low pressure compressor 44 operating at the relatively high rotational speed. The more closed position corresponds to the low pressure compressor 44 operating at the relatively low rotational speed. When the vanes 68*a*-68*c* are in a more open position, the throat area T is greater than when the vanes 68*a*-68*c*** are in a more closed position.

The shapes of the vanes **68*a*-68*c* is an illustration of one possible embodiment. The shape of the vanes 68*a*-68*c* may vary depending on, for example, the components of the low pressure compressor 44 to which the vanes 68*a*-68*c* are attached, the location of the vanes 68*a*-68*c* within the low pressure compressor 44, gas path flow velocities, desired design characteristics of the engine 20, and materials used in fabricating the gas turbine engine 20**.

In this example, FIG. 4 represents the vanes **68*a*-68*c* when they are in their maximum open position. FIG. 5, by contrast, represents the vanes 68*a*-68*c* in the maximum closed position. The throat area T between the vanes 68*a*-68*c* in the maximum closed position is between 62 percent and 65 percent of the throat area when the vanes are in the maximum open position of FIG. 4**. The amount of rotation between the maximum closed position and the maximum open position is from −37 degrees to +18 degrees in this example.

Geared gas turbine engines are unique in that the low pressure compressor 44 rotates at an increased speed compared to a low pressure compressor of prior art direct drive turbine engines. The increased rotational speed of the low pressure compressor 44 leads to different compressor behavior and operation than the low pressure compressors of direct drive engines.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine engine compressor, comprising:

a first compressor section, the first compressor section including:

at least one rotating stage that includes rotating blades and at least one stationary stage upstream thereof that includes stationary guide vanes, which controllably pivot about respective pivot axes for providing flow control into the rotating stage, wherein the stationary guide vanes are configured to pivot from a first position to a second position to influence the flow, the first position corresponding to a first throat area and the second position corresponding to a second throat area that is between 62 percent and 65 percent of the first throat area, the first position corresponding to a maximum open position of the stationary guide vanes, the second position corresponding to a maximum closed position of the stationary guide vanes.

2. The gas turbine engine compressor of claim 1, wherein the first compressor section is a low pressure compressor section and the gas turbine engine compressor further comprises a second compressor section that is a high pressure section, wherein the low pressure compressor section experiences lower pressures than the high pressure compressor section during operation.

3. The gas turbine engine compressor of claim 1, wherein the first compressor section is an axially forwardmost compressor section of a gas turbine engine relative to a direction of flow through the gas turbine engine.

4. The gas turbine engine compressor of claim 1, wherein the stationary vane stage is the axially forwardmost vane stage of the first compressor section.

5. The gas turbine engine compressor of claim 1, wherein a first stage of the first compressor section is the stationary stage.

6. A gas turbine engine comprising the compressor of claim 1, wherein the first compressor section is operatively coupled to a fan drive shaft of a gas turbine engine.

7. The gas turbine engine of claim 6, wherein the fan drive shaft is operatively coupled to a geared architecture configured to drive a fan of the gas turbine engine at a different rotational speed than a rotational speed of the fan drive shaft.

8. A gas turbine engine comprising the compressor of claim 2, wherein the low pressure compressor is positioned axially between a fan of a gas turbine engine and a high pressure compressor of the gas turbine engine.

9. The gas turbine engine compressor of claim 1, wherein the stationary guide vanes are inlet guide vanes.

10. A method of controlling flow into a compressor of a gas turbine engine, wherein the compressor has a first compressor section, the first compressor section including:

at least one rotating stage that includes rotating blades and at least one stationary stage upstream thereof that includes stationary guide vanes, which controllably pivot about respective pivot axes for providing flow control into the at least one rotating stage; the method comprising:

pivoting the stationary guide vanes to influence flow to the rotating blades, the pivoting including pivoting the stationary vanes from a first position to a second position to influence the flow, the first position defining a first throat area in the compressor, the second position corresponding to a second throat area in the compressor that is between 62 percent and 65 percent of the first throat area, the first position corresponding to a maximum open position of the stationary guide vanes, the second position corresponding to a maximum closed position of the stationary guide vanes.

11. The method of claim 10, wherein the stationary guide vanes form a portion of a first stage of the compressor.

12. A gas turbine engine, comprising:

a fan including a plurality of fan blades rotatable about an axis;

a compressor section including a first compressor section;

a combustor in fluid communication with the compressor section;

a turbine section in fluid communication with the combustor;

a geared architecture driven by the turbine section for rotating both the fan and the first compressor section about the axis; and at least one rotating stage that includes rotating blades and at least one stationary stage upstream thereof that includes stationary guide vanes, which controllably pivot about respective pivot axes for providing flow control into the rotation stage, wherein the first compressor section is a low pressure compressor section and the gas turbine engine further comprises a second compressor section that is a high pressure compressor section, wherein the low pressure compressor section experiences lower pressures than the high pressure compressor section during operation, wherein the at least one stationary vane stage is the forwardmost stage of the low pressure compressor section relative to a direction of flow through the gas turbine engine, wherein the stationary guide vanes are configured to move from a first position to a second position to influence the flow, the first position corresponding to a first compressor section first throat area, the second position corresponding to a first compressor section second throat area that is between 62 percent and 65 percent of the first throat area, the first position corresponding to a maximum open position of the stationary guide vanes, the second position corresponding to a maximum closed position of the stationary guide vanes.

* * * * *